United States Patent
Zhang et al.

(10) Patent No.: US 6,566,431 B1
(45) Date of Patent: May 20, 2003

(54) ORGANOHYBRID-BASED DAMPING MATERIAL, METHOD FOR PRODUCING THE SAME, AND METHOD FOR DAMPING USING THE SAME

(75) Inventors: Cheng Zhang, Tokyo (JP); Tadashi Miura, 18-11, Kuboinari 4-chome, Iruma-shi, Saitama, 358-0024 (JP); Masao Sumita, 4-13, Terao-minami 2-chome, Ayase-shi, Kanagawa 252-1134 (JP)

(73) Assignees: Masao Sumita, Kanagawa (JP); Tadashi Miura, Saitama (JP)

( * ) Notice: Subject to any disclaimer, the term of this patent is extended or adjusted under 35 U.S.C. 154(b) by 0 days.

(21) Appl. No.: 09/668,351

(22) Filed: Sep. 25, 2000

(51) Int. Cl.$^7$ .............................. C08K 5/13; C08K 5/36
(52) U.S. Cl. ...................... 524/343; 524/330; 524/331
(58) Field of Search ................................ 524/343, 330, 524/331; 523/351

(56) References Cited

U.S. PATENT DOCUMENTS

| | | | | |
|---|---|---|---|---|
| 3,884,991 A | * | 5/1975 | Kosaka et al. | 525/444 |
| 3,932,323 A | * | 1/1976 | Perry | 523/351 |
| 4,157,359 A | * | 6/1979 | Chang et al. | 524/343 |
| 4,399,188 A | * | 8/1983 | Yamato et al. | 428/913 |
| 4,490,444 A | * | 12/1984 | Thomson | 523/351 |
| 4,659,506 A | * | 4/1987 | Nakamura et al. | 252/399 |
| 4,663,381 A | * | 5/1987 | Blumel et al. | 524/425 |
| 4,752,639 A | * | 6/1988 | Haller et al. | 525/66 |
| 4,918,124 A | * | 4/1990 | Eichenauer et al. | 524/351 |
| 5,053,444 A | * | 10/1991 | Trotoir | 523/351 |
| 5,075,355 A | * | 12/1991 | Hall et al. | |
| 5,102,939 A | * | 4/1992 | Eichenauer et al. | 524/351 |
| 5,411,810 A | * | 5/1995 | Hirakouchi et al. | 525/444 |
| 5,827,584 A | * | 10/1998 | Akao et al. | 428/339 |
| 5,846,656 A | * | 12/1998 | Dunski | 523/351 |
| 5,936,048 A | * | 8/1999 | Oishi et al. | 524/137 |

* cited by examiner

*Primary Examiner*—Peter Szekely
(74) *Attorney, Agent, or Firm*—Birch, Stewart, Kolasch & Birch, LLP

(57) ABSTRACT

The present invention provides a damping composite material, exhibiting more stable and functional damping effects than the conventional one based on the viscous or frictional mechanism to convert mechanical vibrational energy into thermal energy, and also provide a method for producing the same.

The damping material of the present invention comprises at least a material showing piezoelectric, dielectric and electroconductive effects, and an organic polymer matrix material, wherein the material showing piezoelectric, dielectric and electroconductive effects is a compound containing a phenolic group, and the method of the present invention for producing the damping material comprises two steps, one uniformly mixing the material showing piezoelectric, dielectric and electroconductive effects with the organic polymer matrix material at normal temperature or higher, and the other forming the mixture by pressing or drawing at high temperature.

The materials showing piezoelectric, dielectric and electroconductive effects, and useful for the present invention, include 4,4'-thio-bis(3-methyl-6-tertiary butylphenol) and 2,2'-methylene-bis(4-ethyl-6-tertiary butylphenol), and the organic polymer matrix materials useful for the present invention include polyurethane and acrylic rubber.

The damping material of the present invention may be formed into sheet, fiber or expanded shapes, which may be laminated or composited.

8 Claims, 1 Drawing Sheet

ORGANOHYBRID-BASED DAMPING MATERIAL, METHOD FOR PRODUCING THE SAME, AND METHOD FOR DAMPING USING THE SAME

BACKGROUND OF THE INVENTION

1. Field of the Invention

This invention relates to an organohybrid-based damping material and a method for producing the same, more particularly a damping material comprising a piezoelectric, dielectric and electroconductive material and an organic high-molecular-weight matrix material, which efficiently absorbs noise and vibrational energy from the outside and releases it as thermal energy to damp noise and vibrational energy, and a method for producing the same.

The present invention provides a novel damping material, different from the conventional ones, which is applicable to wide areas, including electric appliances, machines, chemistry, construction/civil engineering, and transportation.

2. Description of the Related Art

Normal measures against noise produced by, e.g., home electric appliances and vehicles, especially while they are running on highways and bridges, are thick walls of inorganic materials. Increasing their weight will more efficiently reduce noise. On the other hand, porous fibers (e.g., rock wool and glass wool) have been used to decrease weight of sound and vibration insulating materials. Sound insulating walls are double-structured to reduce weight of the walls. Damping materials have been also developed, e.g., high-molecular-weight materials which directly convert mechanical vibrational energy into thermal energy by the internal viscous and frictional effects, and inorganic ceramic piezoelectric materials which convert vibrational energy into electric energy.

These measures have their own disadvantages. Increasing thickness or weight of sound insulating walls of inorganic materials needs high costs and special structural considerations. On the other hand, inorganic materials for reducing wall weight, e.g., rock wool, glass wool and other porous fibers, have insufficient damping efficiency in a low frequency region, because of their low loss tangent (tanσ) of 0.5 or so at the highest. Double-structured walls for reducing wall weight may have reduced sound transmission loss at a specific frequency, resulting from the resonance produced by the wall masses and air spring between them, causing insufficient sound insulation. High-molecular-weight damping materials have been rarely commercialized, because they try to absorb mechanical energy from the outside based on their own glass transition point, and can absorb noise and vibrational energy from the outside only at around their glass transition point, unable to sufficiently absorb high noise and vibrational energy over a desired temperature range.

SUMMARY OF THE INVENTION

It is an object of the present invention to provide, under these situations, an organohybrid-based damping material capable of efficiently absorbing noise and vibrational energy from the outside and releasing it as thermal energy, and also to provide a method for producing the same.

It is another object of the present invention to provide a damping material showing a high maximum loss tangent (tanσ) over a wide temperature range.

The inventors of the present invention have noticed, after having extensively studied to solve the above problems, that energy is transmitted through a molecule and also between molecules, the former traveling much more efficiently and at a higher speed and being absorbed more efficiently. We have noted that it is important to bind an additive to the polymer at adequate sites and by adequate strength through a chemical bond which is stronger than van der Waals force, e.g., hydrogen bond or bond given by a radical or ionic reaction, rather than merely mixing them, and found a very good energy damping material working on a new principle that a composite of an organic polymer matrix material incorporated with a compound exhibiting piezoelectric, dielectric and electroconductive effects absorbs vibrational energy from the outside as an electric potential to be consumed as Joule heat by the inside electroconductive circuit, reaching the present invention.

The first invention is a composite damping material, obtained by at least mixing a material showing piezoelectric, dielectric and electroconductive effects with an organic polymer matrix material having a polar side chain, wherein the material showing piezoelectric, dielectric and electroconductive effects is a compound shown by the following general formula (I):

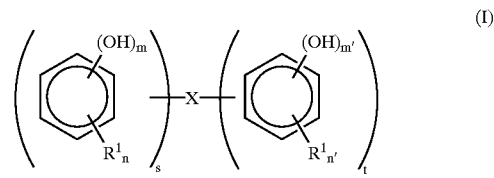

wherein,
(1) $R^1$ and $R^2$ are each a hydrocarbon group having a carbon number of 1 to 10, and may be the same or different,
(2) (m) and (m') are an integer of 1 or 2, and may be the same or different,
(3) (n) and (n') are an integer of 0 to 3, and may be the same or different,
(4) (s) and (t) are an integer of 1 to 3, and may be the same or different, and
(5) X is at least one bonding group selected from the group consisting of oxygen, sulfur and a halogen, or a hydrocarbon group, which may contain at least one of the above atoms, having a carbon number of 1 to 20 and a group containing an ester linkage.

The second invention is a method for producing a composite damping material composed of a material showing piezoelectric, dielectric and electroconductive effects and an organic polymer matrix material, comprising the following two steps (a) and (b):

Step(a)
a step of mixing a material showing piezoelectric, dielectric and electroconductive effects with an organic polymer matrix material at normal temperature or higher, and Step(b)
a step for forming the mixture obtained by Step (a) by pressing or drawing at 100 to 170° C.

DETAILED DESCRIPTION OF THE PREFERRED EMBODIMENTS

Figure 1:
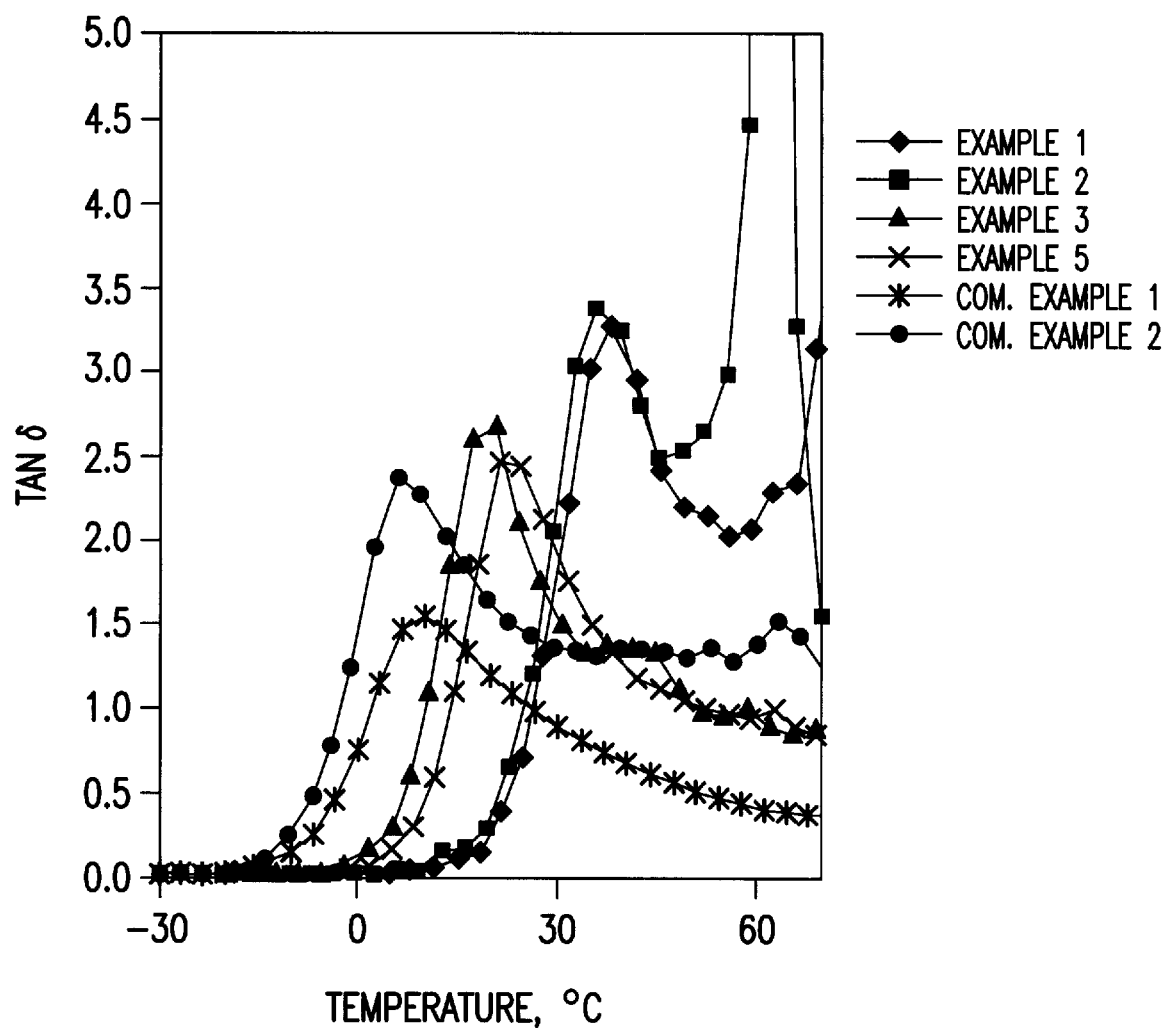
FIG. 1 shows the relationship between loss tangent (tanσ) and temperature for the damping materials of the present invention and comparative materials.

The present invention is more concretely described below:

The organic polymer useful as a constituent for the damping material of the present invention and functioning as the matrix material therefor is not limited, so long as it has a given molecular weight. It may be crystalline or noncrystalline, or polar or nonpolar. The concrete examples include polyurethane, acrylic rubber, butyl rubber, chloroprene, polyvinyl acetate, polyvinyl alcohol, chlorinated rubber, chlorinated polyolefin (such as chlorinated polyethylene and chlorinated polypropylene), ethylene-propylene-diene rubber, low-density polyethylene, high-density polyethylene, polypropylene, polystyrene, polybutene, polyisoprene, styrene-butadiene rubber (SBR), and thermoplastic elastomer (ethylene-propylene rubber). They should contain at least an organic polymer having a polar side chain, e.g., polyurethane, acrylic rubber, polyvinyl acetate, polyvinyl alcohol and chlorinated polyolefin. The preferable organic polymers are those having a polar side chain, e.g., polyurethane and acrylic rubber, more preferably polyurethane. Also, a mixture of the acrylic rubber and chlorinated polyolefin is preferable. The mexture of acrylic rubber 40 to 90 wt. % and chlorinated polyolefine 60 to 10 wt. % is utilized.

Polyurethane useful for the present invention has a urethane bond —NHCOO— in the repeating unit in the main chain, and may be normally prepared by polyaddition reaction between organodiisocyanate and high-molecular-weight diol. The organic diisocyanates useful for the present invention include 4,4'-diphenylmethane diisocyanate, p-phenylene diisocyanate, and tolylene diisocyanate, 4,4'-dicyclohexylmethane diisocyanate, which are normally used as the stocks for producing polyurethane. The high-molecular-weight diols useful for the present invention include polyether type ones, e.g., polyoxypropylene glycol and polyoxypropylene-polyoxyethylene glycol, although not limited.

The polyurethane useful as the organic polymer matrix material for the damping material of the present invention preferably contains a high-molecular-weight diol, having an average molecular weight of 500 to 10,000, preferably 1,000 to 7,000.

The acrylic rubber useful for the present invention preferably has an average molecular weight of 50,000 to 400,000 and glass transition point of −30 to 10° C. Various monomers may be used as the stocks for production of the acrylic rubber. They preferably contain an alkyl acrylate polymer at 30 wt. % or more. The commercial acrylic rubber includes Nihon Zeon's Nipol AR31 and AR32. As an alkyl group, for example, ethyl, n-propyl, iso-butyl and iso-butyl, etc.

The method for producing the organic polymer having a polar side chain is not limited, and it can be produced by, e.g., addition polymerization, polyaddition and polycondensation to polymerize a monomer having a desired polar group.

The compound showing piezoelectric, dielectric and electroconductive effects to be incorporated into the organic polymer is the one having at least one phenolic group in the molecule, e.g., the one shown by the following general formula (I):

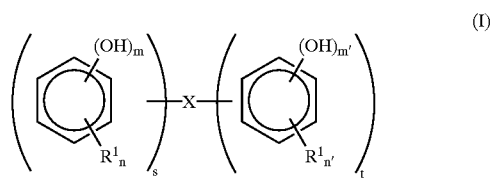

In the general formula (I), $R^1$ and $R^2$ are each a hydrocarbon group having a carbon number of 1 to 10, and may be the same or different, more concretely methyl, ethyl, n-propyl, i-propyl, n-butyl, i-butyl, t-butyl, n-pentyl and i-pentyl;

(m) and (m') are an integer of 1 or 2, and may be the same or different;

(n) and (n') are an integer of 0 to 3, and may be the same or different;

(s) and (t) are an integer of 1 to 3, and may be the same or different; and

X is at least one bonding group selected from the group consisting of oxygen, sulfur and a halogen, or a hydrocarbon group, which may contain at least one of the above atoms, having a carbon number of 1 to 20. The hydrocarbon groups useful for the present invention include alkylene and cycloalkylene, e.g., methylene, ethylene, propylene, n-butylene, i-butylene, pentylene, hexylene and heptylene, and unsaturated groups thereof, e.g., vinylene, propylidene, isopropylidene, butylidene, isobutylidene and cyclohexylene. Also, X is a group containing an ester linkage. As the group containing an ester linkage such as a compound shown below an (4) to (7). Of these bonding groups, preferable ones include, but not limited to, the following ones:

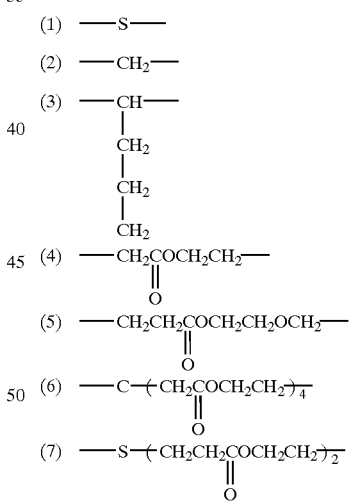

The compounds having a phenolic group, shown by the general formula (I) include diphenol, 4,4'-thio-bis(3-methyl-6-tertiary butylphenol), 4,4'-thio-bis(2-methyl-6-tertiary butylphenol), 4,4'-ethylene-bis(2,6-ditertiary butylphenol), 4,4'-propylene-bis(2-methyl-6-tertiary butylphenol), 2,2'-methylene-bis(4-ethyl-6-tertiary butylphenol), 2,2'-methylene-bis(4-methyl-6-tertiary butylphenol), 4,4'-butylidene-bis(3-methyl-6-tertiary butylphenol), 4,4'-isopropylidene-bis(2,6-ditertiary butylphenol), 2,2'-methylene-bis(4-methyl-6-nonylphenol), 2,2'-isobutylidene-bis-(4,6-dimethylphenol), 2,2'-methylene-bis(4-methyl-6-cyclohexyl-phenol) and tetra-kismethylene 3,5- ditertiary butyl-4-hydrocinnamate, 1,6-hexanediol-bis[β-(3,5-ditertiary butyl-4-hydroxyphenyl)propionate], 1,4-bis(4-benzoyl-3-hydroxyphenoxy)butane, 2,2-thio-diethylene-bis[β-(3,5-ditertiary butyl-4-hydroxyphenyl)propionate], tris (3,5-ditertiary butyl-4-hydroxy benzyl)isocyanulate, 1,1,3-tris(5-tertiary butyl-4-hydroxy-2-methylphenyl)butane, 1,3,5-trimethyl-2,4,6-tris(3,5-ditertiary butyl-4-hydroxybenzyl)benzene, trietyleneglycol-bis[β-(3-tertiary butyl-5-metyl-4-hydroxyphenyl)propionate], 3,9-bis[1,1-dimethyl-2-[β-(3-tertiary butyl-4-hydroxy-5-methylphenyl)propionyloxyethyl]ethyl]-2,4,8,10-tetraoxospiro-[5,5]-un-decane.

The damping material of the present invention may be incorporated with, e.g., a phthalate ester, sulfene amide and oligomer, so long as it does not inhibits the functions of the above organic compound having a phenolic group. The examples of phthalate ester include dihexyl phthalate, dioctyl phthalate, dipentyl phthalate, and dicyclohexyl phthalate. The examples of sulfene amide include N,N-dicyclohexyl-2-benzothiazolylsulfene amide.

The compound showing piezoelectric, dielectric and electroconductive effects can be contained at 5 to 70 wt. %, based on the whole damping material, preferably 10 to 60 wt. %. At below 5 wt. %, the damping material may not exhibit the sufficient damping effect. At above 70 wt. %, on the other hand, the damping effect may not be increased for the quantity used, and other problems, e.g., phase separation, may occur.

The damping material of the present invention may be also uniformly dispersed with at least one additive selected from the group consisting of calcium carbonate, mica, talc, alumina, silica-alumina and graphite, as required, in order to improve its modulus of elasticity. The additive may be contained at 1 to 50 wt. %, based on the whole damping material, preferably 5 to 20 wt. %.

FIG. 1 plots loss tangent (tanσ) against temperature for the damping materials of the present invention and comparative materials, where loss tangent is in a range that maximum tangent loss is observable and tangent loss is observable at −40 to 80° C.

Polyurethane incorporated with the compound having phenolic group, shown by the general formula (I), exhibits a higher maximum loss tangent (tanσ) than acrylic rubber.

As shown in FIG. 1, acrylic rubber incorporated with 4,4'-thio-bis(3-methyl-6-tertiary butylphenol) (Sample No.1), 2,2'-methylene-bis(4-ethyl-6-tertiary butylphenol) (Sample No.3) or 2,2'-methylene-bis(4-methyl-6-tertiary butylphenol) has a higher maximum loss tangent (tanσ) than acrylic rubber itself or acrylic rubber incorporated with N,N-dicyclohexyl-2-benzothiazolesulfeneamide, and a higher loss tangent (tanσ) at 25 to 40° C. (a normal service temperature range), and hence should show higher damping effect.

Next, the method for producing the damping material of the present invention, comprising the organic polymer matrix material and compound exhibiting piezoelectric, dielectric and electroconductive effects, is described.

Step (a) mixes the organic polymer matrix material with the compound exhibiting piezoelectric, dielectric and electroconductive effects at normal temperature or higher, at which the above materials can be combined with each other into the above-described composite, concretely 20 to 180° C., preferably 30 to 100° C. The desired composite may not be obtained when they are mixed at below normal temperature, e.g., 30° C. or lower. At above 180° C., on the other hand, the reaction may proceed excessively.

Step (b) forms the mixture of the organic polymer matrix material and compound exhibiting piezoelectric, dielectric and electroconductive effects, obtained by Step (a), at 100 to 170° C., preferably 120 to 150° C. The mixture may not be formed satisfactorily at below 100° C. because of inadequate viscosity of the mixture, and also at above 170° C. because it may melt to have an extremely low viscosity.

The additive for improving modulus of elasticity of the damping material, e.g., calcium carbonate, mica, talc, alumina, silica-alumina or graphite, may be added to the mixture of the organic polymer matrix material and compound exhibiting piezoelectric, dielectric and electroconductive effects, while it is being prepared, or to the organic polymer beforehand.

The method for mixing the organic polymer matrix material with the compound exhibiting piezoelectric, dielectric and electroconductive effects is not limited. The compound is slowly added to the organic polymer being kneaded at its glass transition temperature or higher, and the mixture is continuously kneaded after addition of the compound is completed. A radical polymerization initiator may be added to the mixture at this stage, in order to adequately bind the compound exhibiting piezoelectric, dielectric and electroconductive effects to the organic polymer matrix material, and thereby to realize an excellent damping effect.

The radical polymerization initiator useful for the present invention may be inorganic or organic. It may be normally benzoyl peroxide, dicumenyl peroxide, tertiary butyl perbenzoic acid, hexyne or the like. It is contained at 0.01 to 2 wt. %, preferably 0.1 to 1 wt. %.

The damping material of the present invention may be formed into sheet, fiber or expanded shapes, which may be laminated or composited. It can be used for various purposes, e.g., sheets to be pasted on walls, floors or electronic devices. For example, the walls can shield/insulate sound, floors can absorb impacts, and electronic appliances (e.g., CD-ROMs and HDDs) can shield/insulate sound and absorb impacts, when coated with the damping material of the present invention.

EXAMPLES

The present invention is described more concretely by Examples and Comparative Examples, which by no means limit the present invention.

Performance of the damping material is evaluated by damping effect represented by dependence of maximum loss tangent (tanσ) on temperature, where loss tangent (tanσ) is determined from dynamic viscoelasticity.

Example 1

A mixture of 20 g of acrylic rubber (Nihon Zeon, AR31) as the organic polymer matrix material (hereinafter referred to as matrix) and 20 g of 4,4'-thio-bis(3-methyl-6-tertiary butylphenol) as the compound exhibiting piezoelectric, dielectric and electroconductive effects (hereinafter referred to as additive), well mixed by a roll mixer at 40° C. for 30 min., was hot-pressed at 140° C. under a pressure of 200 Kgf/cm$^2$ for 20 min., to prepare a damping material (Sample A). FIG. 1 shows its maximum loss tangent (tanσ) at each temperature.

Example 2

A mixture of 20 g of acrylic rubber (Nihon Zeon, AR31) as the matrix and 10 g of 4,4'-thio-bis(3-methyl-6-tertiary butylphenol) as the additive, well mixed by a roll mixer at 60° C. for 30 min., was hot-pressed at 140° C. under a pressure of 200 Kgf/cm$^2$ for 20 min., to prepare a damping material (Sample B).

Example 3

A mixture of 20 g of acrylic rubber (Nihon Zeon, AR31) as the matrix and 20 g of 2,2'-methylene-bis(4-ethyl-6-tertiary butylphenol) as the additive, well mixed by a roll mixer at 60° C. for 30 min., was hot-pressed at 140° C. under a pressure of 200 Kgf/cm$^2$ for 20 min., to prepare a damping material (Sample C).

Example 4

A mixture of 20 g of acrylic rubber (Nihon Zeon, AR31) as the matrix and 10 g of 2,2'-methylene-bis(4-ethyl-6-tertiary butylphenol) as the additive, well mixed by a roll mixer at 40° C. for 30 min., was hot-pressed at 140° C. under a pressure of 200 Kgf/cm$^2$ for 20 min., to prepare a damping material (Sample D).

Example 5

A mixture of 20 g of acrylic rubber (Nihon Zeon, AR31) as the matrix and 10 g of 2,2'-methylene-bis(4-methyl-6-tertiary butylphenol) as the additive, well mixed by a roll mixer at 60° C. for 30 min., was hot-pressed at 140° C. under a pressure of 200 Kgf/cm$^2$ for 20 min., to prepare a damping material (Sample E).

Comparative Example 1

Acrylic rubber (Nihon Zeon, AR31) as the matrix incorporated with no additive was hot-pressed at 140° C. under a pressure of 200 Kgf/cm$^2$ for 20 min., to prepare a damping material (Sample (a)).

Comparative Example 2

A mixture of 20 g of acrylic rubber (Nihon Zeon, AR31) as the matrix and 20 g of N,N-dicyclohexyl-2-benzothiazolylsulfene amide as the additive, well mixed by a roll mixer at 60° C. for 30 min., was hot-pressed at 140° C. under a pressure of 200 Kgf/cm$^2$ for 20 min., to prepare a damping material (Sample (a1)).

Comparative Example 3

Chlorinated polyethylene (Showa Denko, CPE) as the matrix incorporated with no additive was hot-pressed at 140° C. under a pressure of 200 Kgf/cm$^2$ for 20 min., to prepare a damping material (Sample (bb)).

Comparative Example 4

A mixture of 20 g of chlorinated polyethylene (Showa Denko, CPE) as the matrix and 20 g of N,N-dicyclohexyl-2-benzothiazolylsulfene amide as the additive, well mixed by a roll mixer at 100° C. for 30 min., was hot-pressed at 140° C. under a pressure of 200 Kgf/cm$^2$ for 20 min., to prepare a damping material (Sample (bb1)).

Comparative Example 5

A mixture of 20 g of chlorinated polyethylene (Showa Denko, CPE) as the matrix and 20 g of dioctyl phthalate (DOP) as the additive, well mixed by a roll mixer at 100° C. for 30 min., was hot-pressed at 140° C. under a pressure of 200 Kgf/cm$^2$ for 20 min., to prepare a damping material (Sample (bb2)).

Comparative Example 6

A mixture of 20 g of chlorinated polyethylene (Showa Denko, CPE) as the matrix and 10 g of dicyclohexyl phthalate (DCP) as the additive, well mixed by a roll mixer at 100° C. for 30 min., was hot-pressed at 140° C. under a pressure of 200 Kgf/cm$^2$ for 20 min., to prepare a damping material (Sample (bb3)).

Samples A to E and Comparative Samples (a) to (bb3) were analyzed to determine their maximum loss tangent (tanσ) and loss tangent (tanσ) at normal service temperature (25 to 40° C.).

The results are given in Tables 1 and 2.

An organic polymer shows, when exposed to an external force, a constant viscosity/modulus of elasticity ratio, where viscosity represents consumed energy per cycle, whereas modulus of elasticity represents stored energy per cycle. Therefore, viscosity/modulus of elasticity ratio represents effect of the polymer to damp the external force, and the effect is represented by tanσ=viscosity (E2)/modulus of elasticity (E1). E2 and E1 were measured for each sample exposed to vibrations of 50 to 120 Hz in a temperature range from −40 to 80° C. to determine its damping performance. At the same time, tanσ=E2/E1 was determined from the E2 and E1 values measured. It is found that the tanσ value measured well corresponds to the effect of damping sound and vibration, and the damping material of the present invention, having a high tanσ value, greatly reduces vibration and insulates sound by efficiently absorbing mechanical and acoustic energy from the outside and releasing it as thermal energy.

TABLE 1

Maximum tanσ values of the samples

| | | Maximum tanσ | Temperature, ° C. |
|---|---|---|---|
| Example 1 | Sample A | 3.3 | 38.5 |
| Example 2 | Sample B | 3.4 | 36.5 |
| Example 3 | Sample C | 2.7 | 21.0 |
| Example 4 | Sample D | 2.4 | 24.5 |
| Example 5 | Sample E | 2.5 | 21.0 |
| Comparative Example 1 | Comparative Sample a | 2.3 | 6.5 |
| Comparative Example 2 | Comparative Sample a1 | 1.6 | 15.0 |
| Comparative Example 3 | Comparative Sample bb | 0.9 | −3.0 |
| Comparative Example 4 | Comparative Sample bb1 | 1.9 | 10. |
| Comparative Example 5 | Comparative Sample bb2 | 1.4 | −40.0 |
| Comparative Example 6 | Comparative Sample bb3 | 1.5 | −5.0 |

TABLE 2

Tanσ values of the samples at around normal service temperature (25 to 45° C.)

| | | Tanσ | Temperature, ° C. |
|---|---|---|---|
| Example 1 | Sample A | 0.7 | 25.0 |
| | | 3.3 | 38.5 |
| | | 3.2 | 40.0 |
| Example 2 | Sample B | 1.2 | 25.0 |
| | | 3.4 | 36.5 |
| | | 3.3 | 40.0 |
| Example 3 | Sample C | 2.1 | 25.0 |
| | | 1.4 | 40.0 |
| Example 4 | Sample D | 2.3 | 25.0 |
| | | 1.4 | 40.0 |
| Example 5 | Sample F | 2.5 | 25.0 |
| | | 1.3 | 40.0 |
| Comparative Example 1 | Sample a | 1.4 | 25.0 |
| | | 1.3 | 40.0 |
| Comparative Example 2 | Sample a1 | 1.1 | 25.0 |
| | | 0.7 | 40.0 |
| Comparative | Comparative | 0.2 | 25.0 |

TABLE 2-continued

Tanσ values of the samples at around normal service temperature (25 to 45° C.)

|  |  | Tanσ | Temperature, ° C. |
|---|---|---|---|
| Example 3 | Sample bb | 0.1 | 40.0 |
| Comparative | Comparative | 0.7 | 25.0 |
| Example 4 | Sample bb1 | 0.3 | 40.0 |
| Comparative | Comparative | 0.3 | 25.0 |
| Example 5 | Sample bb2 | 0.2 | 40.0 |
| Comparative | Comparative | 0.2 | 25.0 |
| Example 6 | Sample bb3 | 0.2 | 40.0 |

The results of Examples and Comparative Examples indicate that the damping material of the present invention comprising acrylic rubber as the organic polymer matrix and an organic compound having phenolic group shows notably higher damping effects than the damping compositions prepared by Comparative Examples.

EFFECTS OF THE INVENTION

The present invention provides a damping composite material as the new material based on piezoelectric, dielectric and electroconductive effects, exhibiting more stable and functional damping effects than the conventional one based on the viscous or frictional mechanism to convert mechanical vibrational energy into thermal energy. More concretely, it has a higher maximum tanσ value, and also higher tanσ value stably in a normal service temperature range.

What is claimed is:

1. A composite damping material, comprising 5 to 70 wt. %, based on the whole damping material, of a compound shown by the following general formula (I):

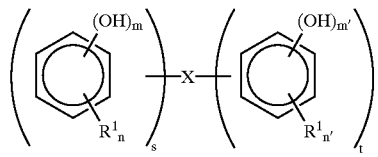

wherein
(1) $R^1$ and $R^2$ are each a hydrocarbon group having a carbon number of 1 to 10, and may be the same or different,
(2) (m) and (m') are an integer of 1 or 2, and may be the same or different,
(3) (n) and (n') are an integer of 0 to 3, and may be the same or different,
(4) (s) and (t) are an integer of 1 to 3, and may be the same or different, and
(5) X is at least one bonding group selected from the group consisting of oxygen, sulfur, a halogen, a hydrocarbon group, which may contain at least one of the above atoms, having a carbon number of 1 to 20, and a group containing an ester linkage, and
an organic polymer matrix material, comprising a mixture of acrylic rubber and chlorinated polyolefin.

2. The composite damping material according to claim 1, wherein weight ratio of the mixture of acrylic rubber (A) and chlorinated polyolefin (B) is (A):(B)=60 to 90:10 to 40.

3. The composite damping material according to claim 1, wherein $R^1$ and $R^2$ in the general formula (I) are each an alkyl group having a carbon number of 1 to 10.

4. The composite damping material according to claim 1, wherein X in the general formula (1) is oxygen, sulfur, an alkylene group or a bonding group selected from one of the following formulae:

(1) —S—

(2) —CH$_2$—

(3) 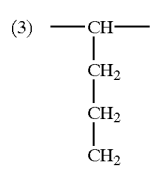

(4) 

(5) 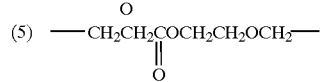

(6) 

(7) 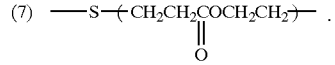

5. The composite damping material according to claim 1, wherein said compound having a phenolic group, shown by the general formula (I), is at least one compound selected from the group consisting of 4,4'-thio-bis(3-methyl-6-tertiary butylphenol), 4,4'-methylen-bis(2,6-ditertiary butylphenol) 4,4'-butylidene-bis(3-methyl-6-tertiary butylphenol), 2,2'-methylene-bis(4-ethyl-6-tertiary butylphenol), 2,2'-methylene-bis(4-methyl-6-tertiary butylphenol) 1,1,3-toris(5-tertiary butyl-4-hydroxy-2-methylphenyl)butane and tetrakismethylene 3,5-ditertiary butyl-4-hydrocinnamate.

6. The composite damping material according to claim 1, wherein said compound shown by the general formula (I) is contained at 10 to 60 wt. %, based on the whole damping material.

7. The composite damping material according to claim 1, wherein said organic polymer matrix material is contained at 30 to 95 wt. %, based on the whole damping material.

8. The composite damping material according to claim 1, wherein said organic polymeer matrix material has a polar side chain.

* * * * *